(12) United States Patent
Yokota et al.

(10) Patent No.: US 10,489,664 B2
(45) Date of Patent: Nov. 26, 2019

(54) IMAGE PROCESSING DEVICE, DEVICE CONTROL SYSTEM, AND COMPUTER-READABLE STORAGE MEDIUM

(71) Applicants: Soichiro Yokota, Kanagawa (JP); Yaojie Lu, Beijing (CN); Tomoko Ishigaki, Kanagawa (JP)

(72) Inventors: Soichiro Yokota, Kanagawa (JP); Yaojie Lu, Beijing (CN); Tomoko Ishigaki, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 277 days.

(21) Appl. No.: 15/115,832

(22) PCT Filed: Feb. 5, 2015

(86) PCT No.: PCT/JP2015/053884
§ 371 (c)(1),
(2) Date: Aug. 1, 2016

(87) PCT Pub. No.: WO2015/119301
PCT Pub. Date: Aug. 13, 2015

(65) Prior Publication Data
US 2017/0177955 A1      Jun. 22, 2017

(30) Foreign Application Priority Data

Feb. 5, 2014   (JP) ................. 2014-020769
Dec. 18, 2014  (JP) ................. 2014-256507

(51) Int. Cl.
*B60R 1/00*     (2006.01)
*B60T 7/12*     (2006.01)
(Continued)

(52) U.S. Cl.
CPC ......... *G06K 9/00805* (2013.01); *B60W 30/08* (2013.01); *G01S 13/931* (2013.01);
(Continued)

(58) Field of Classification Search
CPC ........... G06K 9/00805; G06K 9/00798; G06K 9/00825; G06K 9/00201; G06K 9/00624;
(Continued)

(56) References Cited

U.S. PATENT DOCUMENTS 9,158,738 B2    10/2015  Matsuda et al.
2005/0147277 A1  7/2005  Higaki et al.
(Continued)

FOREIGN PATENT DOCUMENTS

EP    2 579 230 A1    4/2013
JP    2000-266539     9/2000
(Continued)

OTHER PUBLICATIONS

Extended European Search Report dated Jan. 24, 2017 in Patent Application No. 15746645.9.
(Continued)

*Primary Examiner* — Alison Slater
(74) *Attorney, Agent, or Firm* — Oblon, McClelland, Maier & Neustadt, L.L.P.

(57) ABSTRACT

An image processing device includes circuitry to acquire a range image, recognize an external situation indicating a situation of an imaging area corresponding to the range image, recognize a recognition target to be tracked from the range image by a recognition method based on the recognized external situation, remove the recognition target from the range image to generate a new range image, and detect an object in the new range image from which the recognition target has been removed.

9 Claims, 9 Drawing Sheets

(51) Int. Cl.
   *G03B 15/00* (2006.01)
   *G06T 1/00* (2006.01)
   *G08G 1/16* (2006.01)
   *G06K 9/62* (2006.01)
   *G06K 9/00* (2006.01)
   *B60W 30/08* (2012.01)
   *G01S 13/93* (2006.01)
   *G06K 9/32* (2006.01)

(52) U.S. Cl.
   CPC ..... *G06K 9/00791* (2013.01); *G06K 9/00825* (2013.01); *G06K 9/3241* (2013.01); *G06K 2009/3291* (2013.01)

(58) Field of Classification Search
   CPC ...... G06K 9/00791; G06T 2207/10012; G06T 2207/10028; G06T 7/593; G06T 2207/30252; G06T 7/75
   See application file for complete search history.

(56) References Cited

U.S. PATENT DOCUMENTS

| | | | |
|---|---|---|---|
| 2005/0196017 A1 | 9/2005 | Altherr et al. | |
| 2007/0255480 A1* | 11/2007 | Southall | B60T 7/22 701/96 |
| 2008/0089557 A1 | 4/2008 | Iwaki et al. | |
| 2009/0010495 A1* | 1/2009 | Schamp | B60R 21/0134 382/106 |
| 2010/0296705 A1* | 11/2010 | Miksa | G01C 11/02 382/106 |
| 2012/0229646 A1* | 9/2012 | Grandidier | G06K 9/00201 348/149 |
| 2012/0242835 A1 | 9/2012 | Li et al. | |
| 2012/0327189 A1 | 12/2012 | Muramatsu et al. | |
| 2013/0103299 A1 | 4/2013 | Matsuda et al. | |
| 2013/0114860 A1* | 5/2013 | Isaku | G06K 9/46 382/104 |
| 2013/0329013 A1* | 12/2013 | Metois | G01B 11/00 348/46 |
| 2014/0118716 A1* | 5/2014 | Kaganovich | G01S 17/89 356/4.01 |
| 2014/0293052 A1 | 10/2014 | Kuehnle et al. | |
| 2015/0049913 A1 | 2/2015 | Zhong | |
| 2015/0097827 A1* | 4/2015 | Cohen | G06T 5/005 345/420 |
| 2015/0356357 A1* | 12/2015 | McManus | G06K 9/00791 382/104 |

FOREIGN PATENT DOCUMENTS

| | | |
|---|---|---|
| JP | 2004-102421 | 4/2004 |
| JP | 2005-250989 A | 9/2005 |
| JP | 2008-045974 | 2/2008 |
| JP | 2008-151659 | 7/2008 |
| JP | 2011-128756 | 6/2011 |
| JP | 2013-196387 | 9/2013 |
| JP | 2014-006882 | 1/2014 |
| JP | 2014-115987 | 6/2014 |
| WO | WO 2012/066589 A1 | 5/2012 |
| WO | WO 2013/009697 A1 | 1/2013 |

OTHER PUBLICATIONS

International Search Report dated May 19, 2015 in PCT/JP2015/053884 filed Feb. 5, 2015.

Office Action dated Oct. 2, 2018 in Japanese Patent Application No. 2014-256507.

* cited by examiner

FIG.10
(a)
(b)
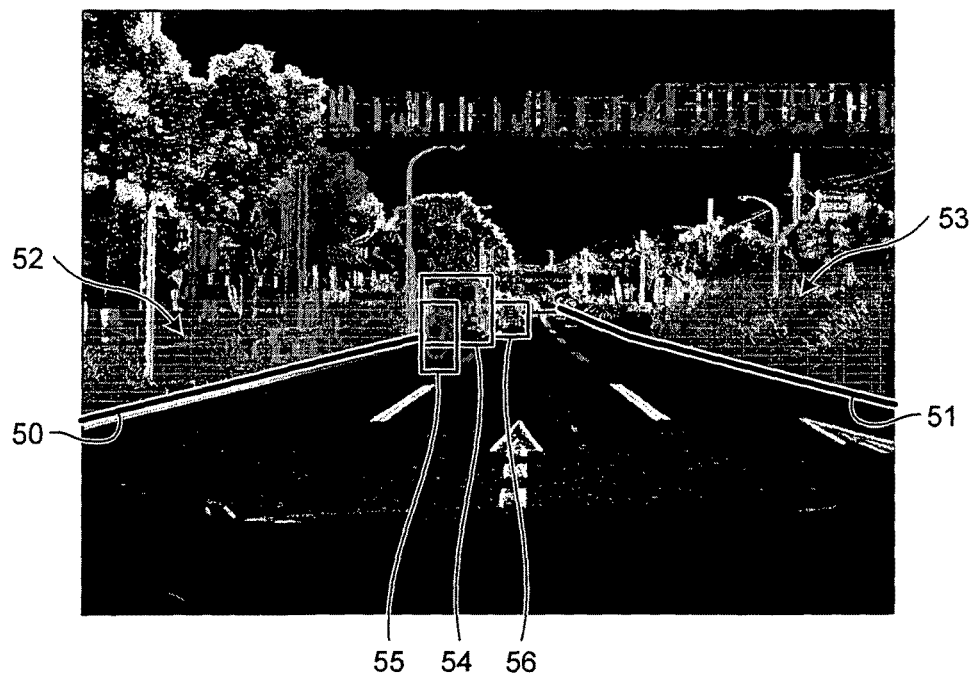

IMAGE PROCESSING DEVICE, DEVICE CONTROL SYSTEM, AND COMPUTER-READABLE STORAGE MEDIUM

TECHNICAL FIELD

The present invention relates to an image processing device, a device control system, and a computer-readable storage medium.

BACKGROUND ART

In recent years, a moving object recognition device is developed, in which a speed and a change of a moving state of a moving object such as a traveling vehicle in front of an own vehicle or a pedestrian are recognized, and a hazard situations such as sudden braking of a preceding vehicle, another vehicle cutting into between the own vehicle and the preceding vehicle, and a pedestrian suddenly rushing out are early detected, and then a warning is provided to a driver to prevent danger.

For example, in the case of recognizing a moving object located in front, there is a method for obtaining a change of a distance from the object in front by using a size change of the object between image frames of two-dimensional images and a focal length of a camera. However, there may be a problem in which accuracy in measuring the distance from the object by this method, for instance, the accuracy in detecting a change of movement of the moving object is low.

Therefore, in Patent Literature 1 (Japanese Laid-open Patent Publication No. 2000-266539), an inter-vehicle distance measurement apparatus is proposed, in which a disparity image (also referred to as range image) is obtained by calculating a disparity from a stereo image obtained by a stereo camera device. The disparity image is the image obtained by converting the disparity to luminance.

The inter-vehicle distance measurement apparatus disclosed in this Patent Literature 1 detects a preceding vehicle from the disparity image, and measures an inter-vehicle distance and a change of the distance based on a moving vector of an edge of a detected vehicle.

However, the inter-vehicle distance measurement apparatus disclosed in Patent Literature 1 has a problem in which recognition accuracy for the moving object is low because the moving object is directly recognized from the disparity image obtained by the stereo camera device.

The present invention is made in consideration of the above-described problems, and is directed to providing an image processing device, a device control system, and an image processing program, capable of improving recognition accuracy for an object.

SUMMARY OF THE INVENTION

It is an object of the present invention to at least partially solve the problems in the conventional technology.

According to an embodiment, there is provided an image processing device that includes a range image acquiring unit configured to acquire a range image; a situation recognizer configured to recognize an external situation indicating a situation of an imaging area corresponding to the range image; and a target recognizer configured to recognize a recognition target from the range image by a recognition method based on a recognition result of the situation recognizer.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 10 is a diagram illustrating exemplary screens tracking a recognition target.

DESCRIPTION OF EMBODIMENTS

In the following, an embodiment of a solid object recognition device applied with an image processing device, a device control system, and an image processing program according to the present invention will be described in detail with reference to the accompanying drawings. Note that, in the following description, a "controlled object" represents an object such as an own vehicle to be controlled by utilizing a recognition result provided by the solid object recognition device according to the embodiment. Further, a "recognition target" represents an object such as a preceding vehicle to be recognized by the solid object recognition device according to the embodiment and causing control for the controlled target.

Figure 1:
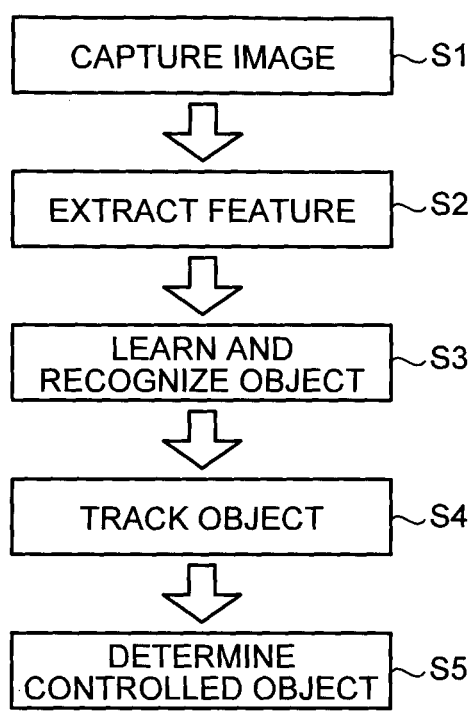
FIG. 1 is a flowchart illustrating a flow of general solid object recognition processing.

First, FIG. 1 is a flowchart illustrating a flow of general solid object recognition processing. As illustrated in FIG. 1, according to the general solid object recognition processing, an image is captured by a camera device or the like in Step S1, and a feature is extracted from the captured image in Step S2. Further, an object is recognized based on the feature in Step S3, and each object is tracked in Step S4 while collating a center gravity of the recognized object with a recognition history of a gravity center of each object that has been recognized so far. In the case where the controlled object to be controlled based on the recognition result of each object is, for example, an automatic brake system, the automatic brake system executes control such as automatically putting on the brake in Step S5 in accordance with the recognition result.

According to the above-described solid object recognition processing, in the event that recognition target is recognized or not recognized frame by frame, some inconvenience (hunting) may be caused in the case of vehicle, for example: when the vehicle is not recognized once but is recognized next time, a distance generated between an own vehicle and a preceding vehicle becomes larger than expected, and to the contrary, the preceding vehicle approaches right in front of the own vehicle when the preceding vehicle puts on the brake. To avoid such inconvenience, stably continuing to recognize the recognition target is important.

However, in the case of recognizing the recognition target based on object edge information, the edge information of the recognition target is recognized or not recognized depending on sensitivity characteristic of a sensor, a change of a lighting condition, etc. even in the case where the same recognition target is captured. For example, while a vehicle is traveling, a recognition target is not recognized in following cases, for example: a position of the sun is changed or backlight occurs, the recognition target is hidden behind other object, and the own vehicle travels behind a building and the like. Further, for example, in the case where a value of the edge information of the recognition target is close to a threshold of a recognition algorithm because of a dim situation, the recognition target is not recognized due to variations of sensor sensitivity or the like. To solve such situations, it is necessary to adjust a parameter of the recognition algorithm, such as adjusting a threshold of a recognition logic for one frame.

Here, according to the general solid object recognition processing, an object recognition algorithm intended to "recognize an object" is applied. In the case of this object recognition algorithm intended to "recognize an object", development is made with a purpose to achieve performance having a maximum recognition rate, being robust over the above-described various changes of external lights, changes of the view of the recognition target, and so on. More specifically, development is made with the purpose to accurately recognize as many objects existing inside one frame as possible regardless the view of the object, a position inside the image, and so on. Therefore, parameter adjustment is applied to this algorithm such that all of the objects can be equally recognized without any order of priority in recognizing the objects that exist inside one frame.

However, the view of the object to be a recognition target often changes with temporal change. This is because the controlled object like the own vehicle also works autonomously, and also the recognition target like the preceding vehicle also works autonomously. For example, in the case where the preceding vehicle travels along a curve of a road surface, or in the case where the preceding vehicle changes a traffic lane to an adjacent traffic lane, the vehicles autonomously work. In such situations, the preceding vehicle is not recognized in many cases because the view of the preceding vehicle changes. Further, in the case where the parameter of the recognition algorithm is adjusted such that the preceding vehicle can be recognized even in the above-described situations, there may be inconvenience in which the preceding vehicle is not recognized or erroneously recognized even in a normal situation as well, such as a case where the preceding vehicle is not recognized even in the case of recognizing the preceding vehicle on a straight road.

Thus, in the case of intending to recognize all of the recognition targets in various kinds of situations (=in the case of applying the recognition algorithm for which parameter adjustment, etc. are applied in order to recognize the recognition target), trade-off of non-recognition and erroneous recognition may occur, and balance design for non-recognition and erroneous recognition is compelled spending enormous man-hour and development time. Also, there still may be inconvenience in which non-recognition or erroneous recognition occurs even in the normal situation despite the fact that the parameter adjustment, etc. are applied by the balance design.

On the other hand, for example, control for the automatic brake system and the like of an automobile is continuously executed not based on one-time recognition result on an object but based on recognition results continuously recognized over time. Therefore, in the case of controlling the controlled object, surely recognizing and tracking the recognition target causing the control is important. The same is applied to a robot, a farm machine, a heavy machinery, etc., not limited to the automobile. In other words, in the case of intending to control the controlled object, equally recognizing all of the objects is not enough, and surely recognizing and tracking the recognition target causing control is important.

Additionally, in the case of executing object recognition with the purpose to control the controlled object, it is preferable to: (1) execute recognition by setting priority levels for recognition targets; (2) be capable of continuously recognizing (tracking: acquiring) a recognition target once recognized without occurrence of non-recognition; (3) prevent an object unstable to be recognized from being set as the controlled object; and (4) be capable of specifying a cause of non-recognition and erroneous recognition.

The priority level referred in (1) is set such that the closer a recognition target is located, the higher the priority level of the recognition target is. Further, the closer to an end the recognition target is located, the lower the priority level of the recognition target is. As, for (2), sufficiently proper control cannot be executed in the case where the object once recognized is not recognized. The controlled object referred in (3) may have inconvenience such as hunting described above. Specifying a cause referred in (4) is necessary at the time of, for example, correcting a program for object recognition control. For example, in the case where erroneous brake operation occurs in a safety traveling'system configured to control a brake of an automobile, specifying the cause thereof is important to correct the program, etc. Therefore, an algorithm in which a processing state such as learning is unclear is hardly adopted for the object recognition control. Additionally, according to the above-mentioned balance design, in most cases, the recognition algorithm for the object recognition control is adjusted so as to stop erroneous recognition although non-recognition is slightly increased. In other words, recognition algorithm for the object recognition control tends to be adjusted so as to enhance security by stopping the erroneous operation caused by the erroneous recognition.

Considering the above, the solid object recognition device according to the embodiment firstly recognizes a current situation from an "internal situation" such as a travel speed of a controlled object (for example, own vehicle) and an "external situation" such as existence of a recognition target already recognized (preceding vehicle, wall, road, etc.). Once the current situation is recognized, it is possible to predict, for example, a person coming out in front of the own vehicle from behind the preceding vehicle, and the like (prediction of next event). Therefore, the prediction result can be reflected in future control. For example, a recognition target stably recognized is determined to have a high priority level, and a simple algorithm having a reduced threshold is adopted such that recognition can be executed even when brightness slightly changes, and the like. Further, even in the case where a shape of the recognition target (preceding vehicle) is changed at a road curve or the like, and becomes hardly recognized, recognition is actively executed in the case where such a change is a predicted change. More specifically, the solid object recognition device according to the embodiment varies or selects weight of a plurality of algorithms or an algorithm for use based on determination and prediction of the situation. This dramatically improves recognition accuracy for the object.

Further, besides changing the threshold, the following algorithm may be executed as well. More specifically, according to a normal recognition technology, check by a plurality of algorithms is executed related to, for example, whether an object exists in a road, whether having symmetric property, and so on. However, some of the algorithms may be omitted relative to the object stably recognized. More specifically, the solid object recognition device according to the embodiment uses a different recognition method depending on an external situation and a future external situation recognized from an imaging area. Further, the solid object recognition device according to the embodiment deletes an existing object after tracking, in a predetermined imaging frame, the existing object recognized in a previous frame, and further recognizes a new object. By this, the object stably recognized can be continuously tracked with high accuracy, and recognition accuracy for the new object can be improved.

Figure 2:
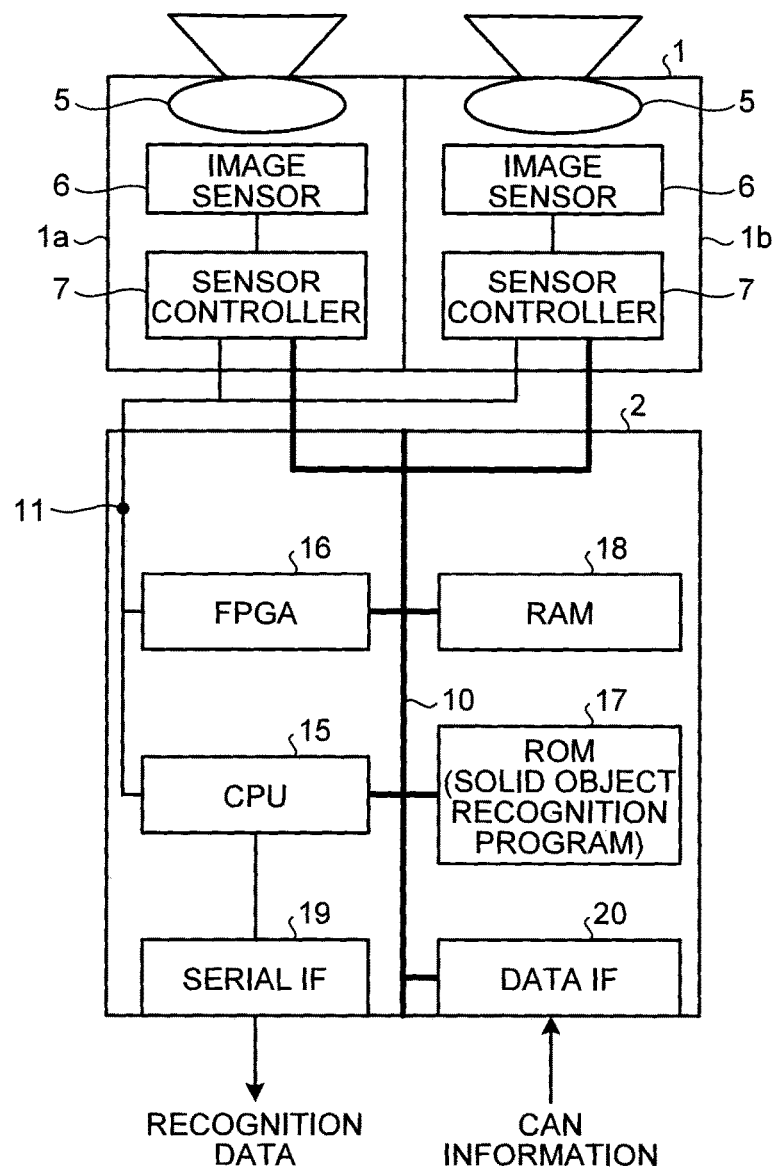
FIG. 2 is a diagram illustrating a hardware configuration of a main portion of a solid object recognition device according to an embodiment.

FIG. 2 is a diagram illustrating a hardware configuration of the solid object recognition device according to the embodiment. As illustrated in FIG. 2, the solid object recognition device according to the embodiment includes a stereo camera unit 1 and an information processing unit 2.

The stereo camera unit 1 includes a first camera unit 1a for a left eye and a second camera unit 1b for a right eye, and these two camera units are set in parallel. Each of the camera units 1a, 1b includes a lens 5, an image sensor 6, and a sensor controller 7. The image sensor 6 is, for example, a CCD image sensor or a CMOS image sensor. The CCD is an abbreviation of "Charge Coupled Device". The CMOS is an abbreviation of "Complementary Metal-Oxide Semiconductor". The sensor controller 7 executes exposure control for the image sensor 6, image reading control, communication with an external circuit, transmission control for image data, and so on.

The information processing unit 2 includes a data bus line 10, a serial bus line 11, a CPU 15, an FPGA 16, a ROM 17, a RAM 18, a serial IF 19, and a data IF 20. The CPU is an abbreviation of "Central Processing Unit". The FPGA is an abbreviation of "Field-Programmable Gate Array". The ROM is an abbreviation of "Read Only Memory". The RAM is an abbreviation of "Random Access Memory". The IF is an abbreviation of "interface".

The above-mentioned stereo camera unit 1 is connected to the information processing unit 2 via the data bus line 10 and the serial bus line 11. The CPU 15 controls execution of entire operation of the information processing unit 2, image processing, and image recognition processing. Luminance image data of an image captured by the image sensor 6 in each of the camera units 1a, 1b is written in the RAM 12 of the information processing unit 2 via the data bus line 10. Control data for changing a sensor exposure value, control data for changing an image reading parameter, various kinds of setting data, etc. from the CPU 15 or the FPGA 16 are transmitted and received via the serial bus line 11.

The FPGA 16 executes disparity calculation to generate a disparity image, and rewrites the disparity image in the RAM 18. The disparity calculation is the processing in which real-time property relative to the image data stored in the RAM 18 is demanded, and includes, for example, gamma correction, distortion correction (parallelization of right and left images) and block matching. The CPU 15 executes control for each sensor controller 7 in the stereo camera unit 1, and general control for the information processing unit 2. Further, the ROM 17 stores a solid object recognition program to execute situation recognition, prediction, solid object recognition, etc. described later. The solid object recognition program is an example of the image processing program which may be stored in a computer-readable storage medium such as CD-ROM, DVD, and semiconductor memory. The CPU 15 acquires, for example, CAN information (vehicle speed, acceleration rate, rudder angle, yaw rate, etc.) of the own vehicle via the data IF 20 as the parameters. Further, the CPU 15 controls execution of various kinds of processing such as situation recognition by using the luminance image and the disparity image stored in the RAM 18 in accordance with the solid object recognition program stored in the ROM 17, thereby recognizing the recognition target such as the preceding vehicle. The CAN is an abbreviation of "Controller Area Network".

Recognition data of the recognition target is supplied to an external device, such as the automatic brake system or an automatic speed control system, via the serial IF 19. The automatic brake system executes brake control of the own vehicle, using the recognition data of recognition target. Further, the automatic speed control system executes speed control of the own vehicle, using the recognition data of the recognition target.

Figure 3:
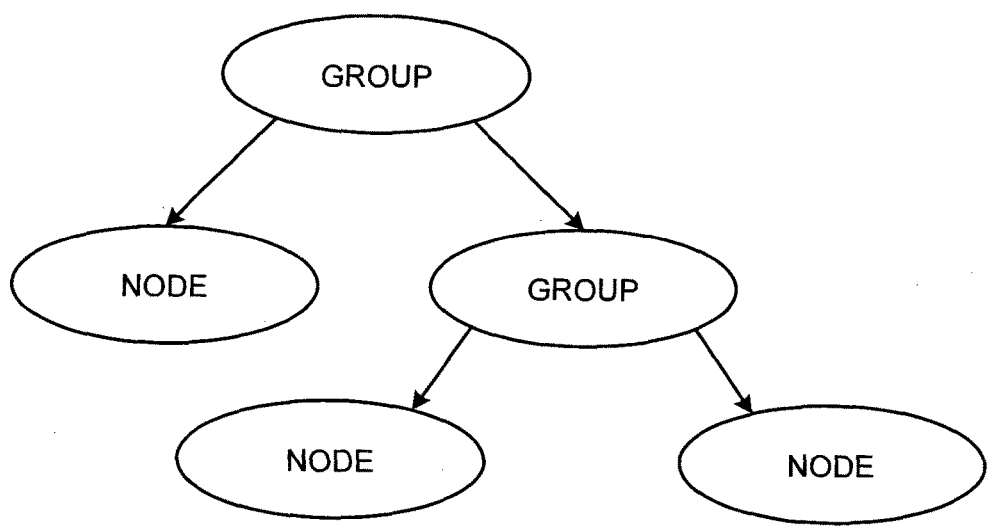
FIG. 3 is a schematic diagram for describing a scene graph.
Figure 4:
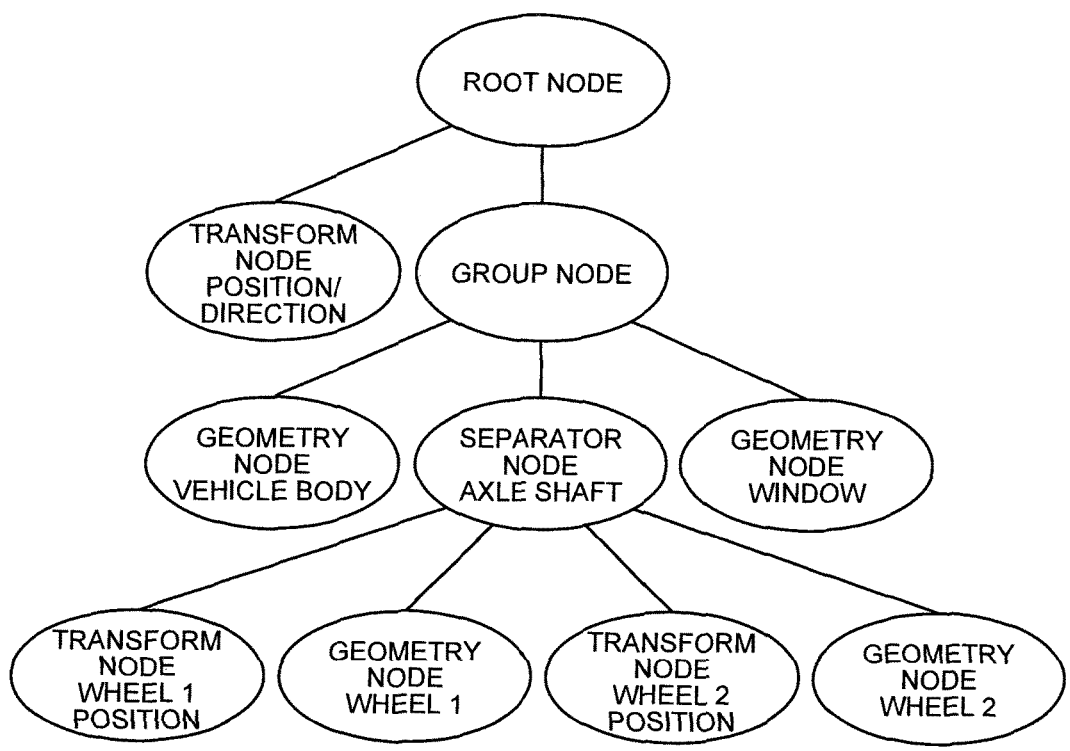
FIG. 4 is a schematic diagram for describing a vehicle scene graph.

Next, the solid object recognition device according to the embodiment is configured to describe a solid object, such as a person and a vehicle, and a current situation with a scene graph. FIG. 3 is a diagram illustrating a basic configuration of the scene graph, and FIG. 4 is a diagram illustrating an example of the scene graph of a vehicle. As is obvious from FIGS. 3 and 4, the scene graph is expressed by a tree structure. Further, the scene graph is described using a computer language such as BIFS or VRML. The BIFS is an abbreviation of "Binary Format for Scene description". Or, the VRML is an abbreviation of "Virtual Reality Modeling Language". In the scene graph, structural units called nodes are hierarchically combined to form a group, and a scene (situation) is formed of integration of the nodes. The node is the structural unit of the situation including fields of a light source, a shape, quality of material, a color, a coordinate, etc., and further forms hierarchized description by having a node of a lower level.

Figure 5:
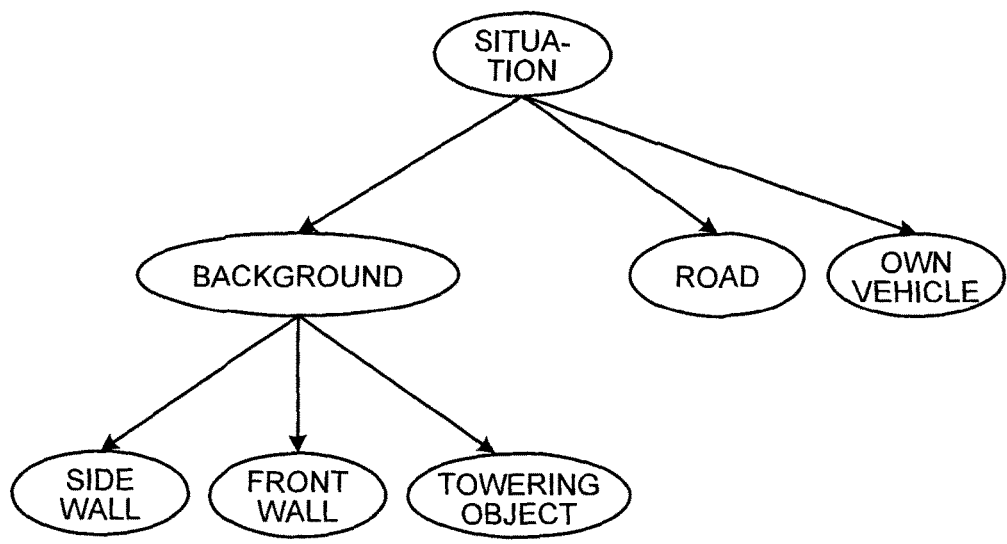
FIG. 5 is a diagram illustrating a scene graph of a scene situation model described in the solid object recognition device according to the embodiment.

FIG. 5 is a diagram illustrating an example of a "scene situation model" which is the scene graph where a current situation is described. The scene situation model in FIG. 5 is the example in which situational components useful for front monitoring of the own vehicle are described. According to the example illustrated in FIG. 5, respective nodes of "background object", "road", and "own vehicle" are described. Further, the nodes of "side wall", "front wall", and "towering object" are described in the lower level of the node of "background object". Each node includes, for example, entities such as a three-dimensional position, a gravity center, a relative speed, a size, and reliability. Further, in some nodes, there may be a case where information unique to the node, such as road surface height, a road end position (travelable area), or curve curvature, is included.

Figure 6:
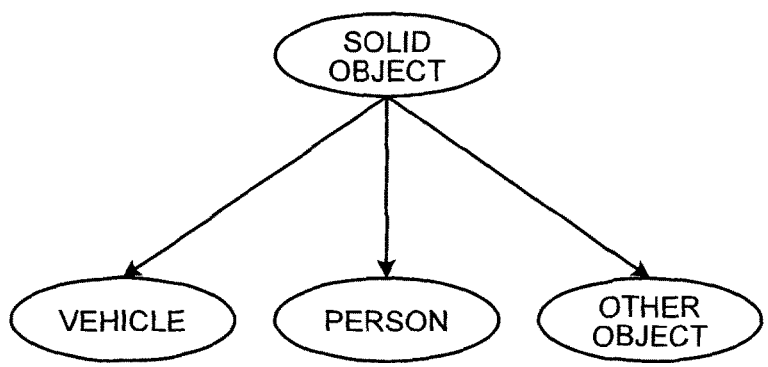
FIG. 6 is a diagram illustrating a scene graph of a solid object model described in the solid object recognition device according to the embodiment.

FIG. 6 is a diagram illustrating an example of a "solid object model" which is a scene graph in which the solid object is described. According to the application intended to prevent collision caused by brake control, steering control, or the like of the controlled object, the most important recognition target is a recognition target included in a group of the solid objects including a person and a vehicle. The solid object recognition device according to the embodiment is configured to describe the solid object model separately from the above-described scene situation model. The example in FIG. 6, respective nodes of "vehicle", "person" and "other object" are described. The node of the solid object model is described so as to include the components common with the above-described entities of the background object, such as the three-dimensional position, gravity center, relative speed, size, and reliability, and further include entities such as a detailed type of the solid object and a moving direction. In the case where the solid object is, for example, a vehicle, a vehicle type such as a large-sized vehicle, a standard-sized vehicle, or the like is described. In the case where the solid object is, for example, a person, a type such as an adult, a child, or the like is described. Note that the above-described "scene situation model" and "solid object model" are preliminarily defined and stored in the ROM 17. The scenes described in the scene situation model are, concretely, situations such as an expressway and a school zone. Further, respective solid objects described in the solid object model are, concretely, stationary objects such as a road sign and a traffic light, and moving objects such as a vehicle and a person.

In the controlled object such as the automatic brake system or the automatic speed control system, control is executed when a recognition result of the solid object described using FIG. 6 is determined hazardous by executing calculation based on the position and the speed included in the CAN information of the scene situation model described using FIG. 5. Further, control is also executed in the case where hazard of collision with the background object is calculated. The solid object recognition device according to the embodiment determines the priority levels for the recognition targets in a next frame by calculating possibility of collision with a recognized solid object (including the background object), considering the position of the own vehicle and road information. More specifically, the high priority level is set for the solid object having high possibility of collision with the own vehicle, and low priority level is set for the solid object having low possibility of collision with the own vehicle.

The scene situation model and the solid object model illustrated in FIGS. 5 and 6 are recognized per frame of an image captured by the stereo camera unit 1, and further recorded and updated as history information, and all of the information is utilized for next operation.

Figure 7:
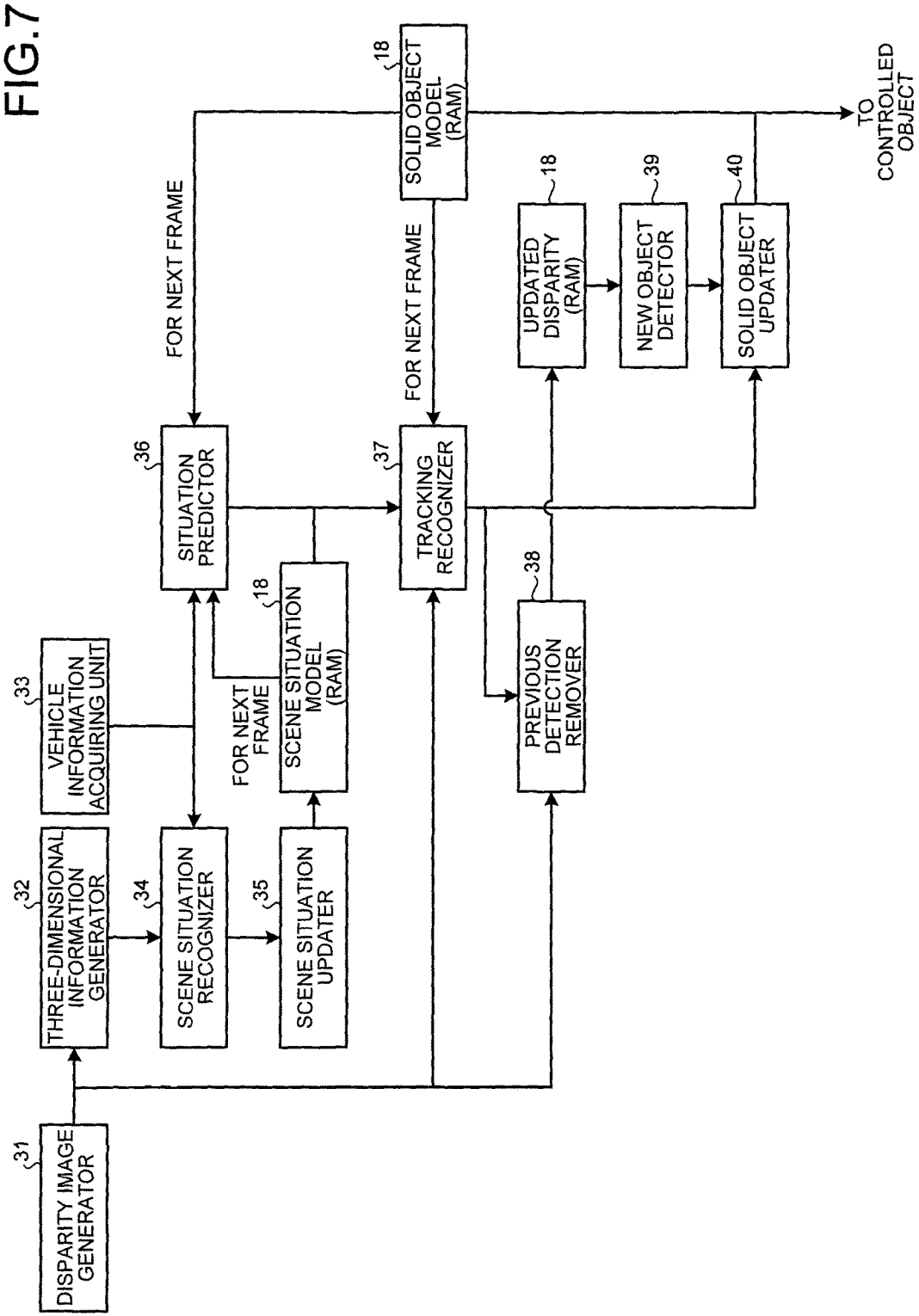
FIG. 7 is a functional block diagram of the solid object recognition device according to the embodiment.

FIG. 7 is a functional block diagram of respective functions implemented by operation of the CPU 15 of the solid object recognition device according to the embodiment in accordance with the solid object recognition program. As illustrated in FIG. 7, the CPU 15 functions as a three-dimensional information generator 32, a vehicle information (CAN information) acquiring unit 33, a scene situation recognizer 34, and a scene situation updater 35. Further, the CPU 15 functions as a situation predictor 36, a tracking recognizer 37, a previous detection remover 38, a new object detector 39, and a solid object updater 40. Note that the FPGA 16 functions as the disparity image generator 31 illustrated in FIG. 7, and generates the disparity image (range image) as described above. Further, the respective units 31 to 40 may be entirely implemented by software, or may be entirely or partly implemented by hardware.

The disparity image generator 31 is an example of a range image acquiring unit. The scene situation recognizer 34 is an example of a situation recognizer. The tracking recognizer 37 and the new object detector 39 are examples of a target recognizer. The vehicle information acquiring unit 33 is an example of an internal situation acquiring unit. The previous detection remover 38 is an example of a remover.

According to the above-described solid object recognition device, when respective captured images such as the preceding vehicle in front and landscape captured by the respective camera units 1a, 1b of the stereo camera unit 1 are stored in the RAM 18, the disparity image generator 31 generates a so-called disparity image (range image) in which the disparity of the respective captured images is converted to luminance, and stores the disparity image in the RAM 18. The three-dimensional information generator 32 generates a three-dimensional image including three-dimensional information from the disparity image stored in the RAM 18, and stores the three-dimensional image in the RAM 18. Further, in this example, the range image is the disparity image generated from the respective captured images of the respective camera units 1a, 1b. Besides, there is an example in which distance information indicating a distance from the object may be used instead of the disparity image. The distance information is obtained by calculating a time from irradiating each solid object with a radar wave until receiving the radar wave reflected by the solid object. Note that, in the present specification, an image including the disparity image for which the distance information is associated with image information is defined as the range image.

The scene situation recognizer 34 recognizes the speed, moving direction, etc. of the own vehicle from the CAN information indicating a current vehicle situation (internal situation indicating operational situation of a device to be the controlled object) acquired by the vehicle information acquiring unit 33. Further, the scene situation recognizer 34 recognizes the external situation such as the background object, road, preceding vehicle, and person included in the three-dimensional image. The scene situation updater 35 generates the scene situation model representing the current situation described using FIG. 5 from a recognition result of the scene situation recognizer 34, and stores the scene situation model in the RAM 18. The above recognition of the current situation is executed per frame of the image. The scene situation updater 35 updates the scene situation model in the RAM 18 every time the current situation is recognized.

Next, the situation predictor 36 predicts situations of the own vehicle, person, preceding vehicle, side wall, road, etc. by using the CAN information indicating the current vehicle situation, the scene situation model representing the current situation updated on the RAM 18, and the solid object model representing a current situation of a new solid object other than the currently recognized solid object, such as a person or a vehicle (refer to FIG. 6), and generates prediction information.

The tracking recognizer 37 recognizes the solid object inside a current disparity image stored in the RAM 18, and further recognizes some solid objects in descending order of the priority level as the recognition targets. As for the tracking recognizer 37, the recognition target having a high priority level is, for example, a recognition target located in front of the own vehicle. Further, a recognition target located at a frame end has a low priority level.

Further, the tracking recognizer 37 changes a threshold used in a recognition method for the recognition target or applies a different recognition method by using the scene situation model and solid object model representing the current situation and stored in the RAM 18, and the prediction result obtained from the situation predictor 36. For example, a recognition target stably recognized is determined to have a high priority level, and a simple algorithm having a reduced threshold is adopted such that recognition can be executed even when brightness slightly changes, and the like. Further, even in the case where a shape of the recognition target (preceding vehicle) is changed at a road curve or the like, and becomes hardly recognized, recognition is actively executed in the case where such a change is a predicted change.

The tracking recognizer 37 varies or selects the weight of the plurality of algorithms or the algorithm based on situational determination and prediction, and recognizes the recognition target. By this, the recognition target which is recognized or not recognized frame by frame due to a subtle change of brightness can be continuously recognized (tracked) in a stable manner. Further, even in the case where the shape of the preceding vehicle is changed and can be hardly seen when the preceding vehicle travels at a road curve, recognition can be stably continued.

Next, the previous detection remover 38 removes the recognition target being tracked by the tracking recognizer 37 from among the objects included inside the current disparity image stored in the RAM 18, and further stores the disparity image as an updated disparity image in the RAM 18.

The new object detector 39 recognizes a solid object such as the vehicle or the person inside the updated disparity image from which the recognition target tracked by the tracking recognizer 37 is removed, thereby recognizing a new solid object different from the recognition target currently tracked by the tracking recognizer 37. The solid object updater 40 reflects the new solid object recognized by the new object detector 39 in the solid object model stored in the RAM 18 and illustrated in FIG. 6, thereby updating the solid object model stored in the RAM 18. The situation predictor 36 predicts the situation, using the updated solid object model in which the new solid object is thus reflected.

Further, the solid object updater 40 supplies the recognition result of the recognition target from the tracking recognizer 37 to an external device to be the controlled object such as the automatic brake system and the automatic speed control system. By this, the brake of the vehicle is automatically put on, or the travel speed of the vehicle is automatically adjusted in accordance with the recognition result of the recognition target.

Next, prediction processing in the situation predictor 36 will be described in detail. The situation predictor 36 calculates a "position of a recognition object", a "shape change rate of a recognition object", and a "shielded ratio of a recognition object". The tracking recognizer 37 uses these calculation results as a situational prediction result of the recognition target.

First, the position of the recognition object can be calculated using Kalman filter, Bayesian filter, or the like. Further, a position and a speed $x_f(t)$, $v_f(t)$ of the own vehicle, and a position and a speed $x_p(t)$, $v_p(t)$ of the preceding vehicle at a certain time t can be calculated by the following equations.

$$v_f(t)=v_f(t-1)+a_f t$$

$$x_f(t)=x_f(t-1)+v_f t+((a_f t^2)/2)$$

$$v_p(t)=v_p(t-1)+a_p t$$

$$x_p(t)=x_p(t-1)+v_p t+((a_p t^2)/2)$$

A relative real coordinate position of the recognition object from the own vehicle can be represented by "$x_p(t)-x_f(t)$". In the case of mapping a three-dimensional point of the relative real coordinate position from the own vehicle, calculated from the expression "$x_p(t)-x_f(t)$" as "($X_p$, $Y_p$, $Z_p$)", a position of the recognition object inside a captured image at the time t is calculated by the following equations, for example.

$$x_{predict}=f(Xp/Zp)$$

$$y_{predict}=f(Yp/Zp)$$

Here, assuming that ($x_{predict}$, $y_{predict}$) is a gravity center position of the recognition object in the captured image, an area Parea of a prediction processing area for object recognition is set to include an entire object as shown in the following equation by using the size $x_{width}$ and $y_{height}$ of the recognition object centering the gravity center position.

$$P_{area}=(x_{width}+\omega_1/R+\omega_2 E)\times(y_{height}+\omega_1/R+\omega_2 E)$$

In this equation, R represents reliability of the recognition result up to time t−1 (in the case of stable recognition, high reliability is indicated), and E represents a recognition error, and ω1 and ω2 represent weights in which the reliability and the recognition error are reflected. According to the present embodiment, the same weights are applied in x-direction and y-direction provided as an example. Different weights may be applied respectively in the x-direction and the y-direction. In the case where reliability is low or in the case where the recognition error is high, recognition is executed in a larger range. Note that, for example, the number of frames in which the object is continuously recognized may be used as the reliability.

Next, the shape change rate of the recognition object "$\Delta_{obj}$" is obtained based on, for example, a position ($X_p$, $Y_p$, $Z_p$) by calculating a curvature of the road $C(X_p, Y_p, Z_p)$ located at this position and a slope percentage $S(X_p, Y_p, Z_p)$ from a moving direction ($X_p$, $Y_p$, $Z_p$) of the solid object described using FIG. 6 and the road information described using FIG. 5, and then multiplying these results as illustrated in the following equation. Note that in the case of calculating the road curvature and the slope percentage, methods disclosed in Japanese Patent Application Laid-Open No. 2004-102421 or Japanese Patent Application Laid-Open No. 2014-006882 and other known methods are suitably used.

$$\Delta_{obj}=C((X_p+X_v), (Y_p+Y_v), (Z_p+Z_v))\times S((X_p+X_v), (Y_p+Y_v), (Z_p+Z_v))$$

In the case of implementation, weights may be added to "C" and "S", and preferably, normalization processing is applied.

In the same manner, the shielded ratio of the recognition object "$H_{obj}$" is obtained based on, for example, ($X_p$, $Y_p$, $Z_p$) and ($X_v$, $Y_v$, $Z_v$) by calculating a positional relation between a background object and other solid object located near the position, from the background information described using FIG. 5, and then predicting whether the background object is to be positioned in front of the recognition object based on a trajectory of the recognition object. This prediction can be represented by the following function.

$$H_{obj}=Func(\Sigma D_{bo}, \Sigma D_{oo}, \Sigma R_{info})$$

Here, $D_{bo}$ is a variable representing a distance from the background object, obtained by calculating a difference of the positional relation with the background object based on ($X_p$, $Y_p$, $Z_p$) and ($X_v$, $Y_v$, $Z_v$). A value of $D_{bo}$ becomes high in the case where the positional relation is overlapping. The $D_{oo}$ is a variable obtained by calculating a difference of the positional relation with the other solid object based on ($X_p$, $Y_p$, $Z_p$) and ($X_v$, $Y_v$, $Z_v$). The value of $D_{oo}$ becomes high in the case where the positional relation is overlapping. $R_{info}$ is the road information described using FIG. 5 (obtained by integrating "C" and "S"). Note that $H_{obj}$ is a vector quantity including directional information. The shape of the object after being shielded can be specified by calculating how far and from which direction the object is shielded. Further, in addition to this, the situation predictor 36 calculates a rate of the recognition object shielded by other recognition object based on the prediction result.

This clarifies the shape of the recognition object that can be recognized when the recognition object is shielded by the other recognition object, and therefore, a recognition rate of the recognition object can be improved. Further, the recognition object can be continuously recognized and tracked without occurrence of non-recognition for the recognition object (recognition object can be tracked without losing sight thereof).

Thus, the situation predictor 36 can calculate the shape change rate of the recognition object and the shielded ratio of the recognition object by recognizing the situation along with prediction of the position of the recognition object used in the tracking method in the related art, such as Karman filter. Therefore, for example, in the case where the shape change rate of the recognition object is low or the shielded ratio of the recognition object is low, the recognition method for the recognition target can be changed to a recognition method whereby the recognition target is simply and actively recognized. Further, in the case where the shape change rate of the recognition object or the shielded ratio of the recognition object is high, a recognition method suitable for the calculated recognition object shape change rate or recognition object shielded ratio can be selected and used.

Figure 8:
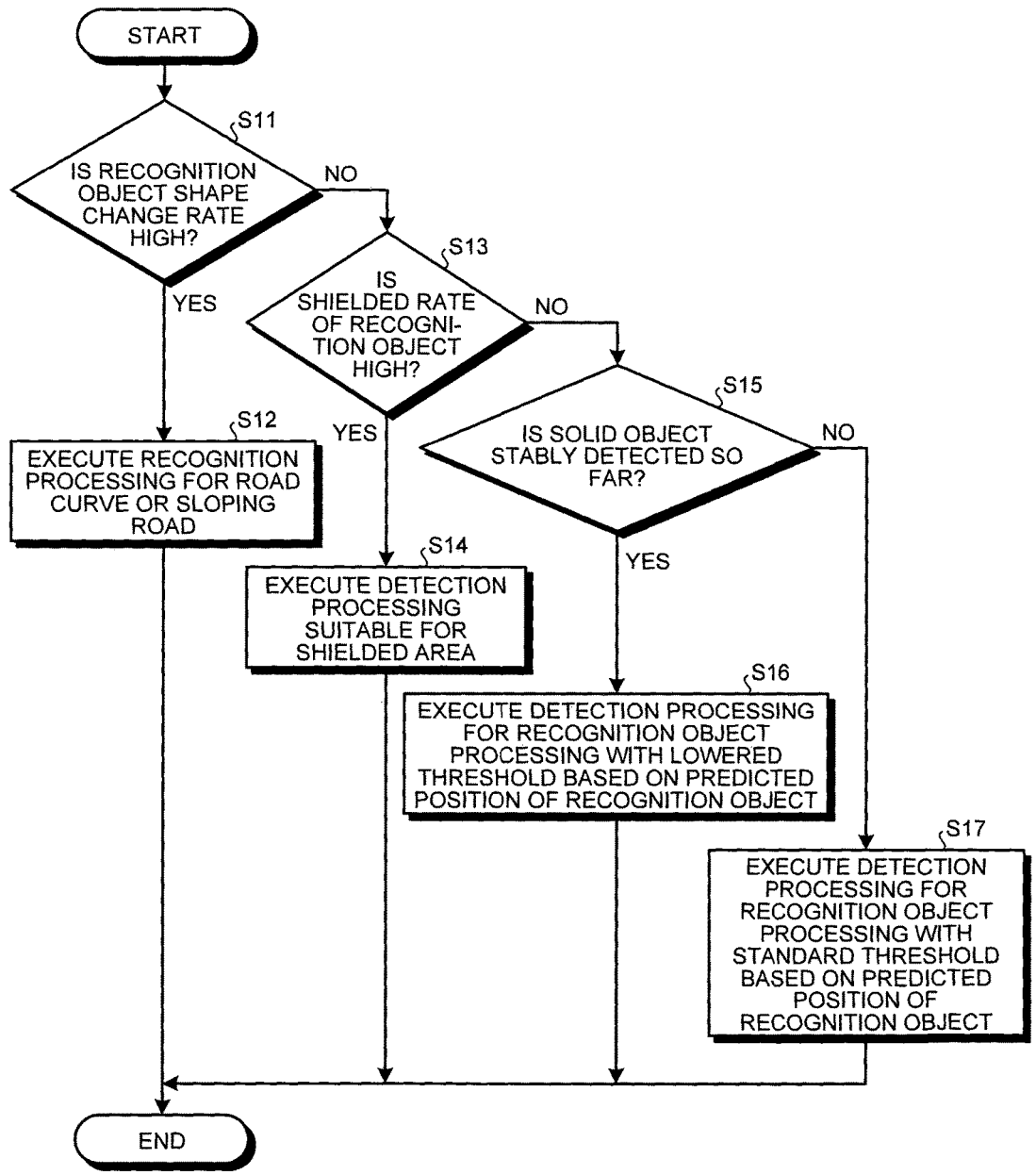
FIG. 8 is a flowchart for describing operation to change a recognition method for a recognition, target in accordance with a situational prediction result in the solid object recognition device according to the embodiment.

Next, FIG. 8 is a flowchart illustrating an operation flow in which the tracking recognizer 37 executes change of the recognition method for the recognition target, change of the threshold, and the like in accordance with the prediction result from the situation predictor 36. The tracking recognizer 37 starts processing from Step S11 to the flowchart in FIG. 8 at the timing when the above-described position of the recognition object, shape change rate of the recognition object, and shielded ratio of the recognition object are calculated by the situation predictor 36. Note that the position of the recognition object, shape change rate of the recognition object, and shielded ratio of the recognition object are calculated per frame. Therefore, the tracking recognizer 37 repeatedly executes, per frame, operation illustrated in the flowchart of FIG. 8.

In Step S11, the tracking recognizer 37 determines whether the shape change rate of the recognition object calculated by the situation predictor 36 is higher than a predetermined threshold. In the case where the shape change rate of the recognition object is higher than the threshold, it is indicated that the shape of the recognition target currently recognized is largely changed. Therefore, in the case where the shape change rate of the recognition object is higher than the threshold (Step S11: Yes), the tracking recognizer 37 proceeds with processing in Step S12. Further, for example, in the case where the recognition target is a preceding vehicle, the tracking recognizer 37 executes control to select a recognition method for a road curve or a recognition method for a sloping road, or change the threshold of the recognition method currently executed to a threshold for the road curve or the sloping road. By this, the object can be surely acquired and continuously recognized even in the case where the recognized shape of the recognition target such as the preceding vehicle is changed when the vehicle travels at the road curve or the sloping road.

Next, in the case of determining in Step S11 that the shape change rate of the recognition object is lower than the predetermined threshold (Step S11: No), the tracking recognizer 37 proceeds with processing in Step S13, and determines whether the shielded ratio of the recognition object is higher than a predetermined threshold. For example, in the case where the shielded ratio of the recognition object of the preceding vehicle which is the current recognition target is higher than the threshold, it is indicated that other solid object such as a wall or other vehicle exists between the preceding vehicle and the own vehicle. Therefore, in the case where the shielded ratio of the recognition object is higher than the predetermined threshold (Step S13: Yes), the processing is proceeded to Step S14, and control is made to select a recognition method suitable for a shielded area of the recognition target, or change the threshold of the recognition method currently executed to a threshold value suitable for the shielded area of the recognition target. By this, the preceding vehicle can be surely acquired and continuously recognized even in the case where the preceding vehicle is hidden behind a shade or hidden behind other vehicle.

Next, in the case where the shielded ratio of the recognition object is lower than the predetermined threshold in Step S13 (Step S13: No), the tracking recognizer 37 proceeds with processing in Step S15, and determines whether the solid object is stably detected. More specifically, the tracking recognizer 37 determines whether the solid object is stably detected by determining whether, for example, an image shape (luminance image) or a disparity shape (disparity image) is detected almost without a temporal change. Then, in the case where of determining that the solid object is stably detected (Step S15: Yes), the tracking recognizer 37 proceeds with processing in Step S16, and in the case of determining that the solid object is not stably detected (Step S15: No), the tracking recognizer 37 proceeds with processing in Step S17.

When the processing is proceeded to Step S16 by determining that the solid object is stably detected, the tracking recognizer 37 changes the threshold currently used in the recognition method for the recognition target to a threshold in which a value is reduced by a predetermined amount. By this, the recognition target can be correctly recognized and tracked using a predicted position and the like of the recognition target.

Further, when the processing is proceeded to Step S17 by determining that the solid object cannot be stably detected, the tracking recognizer 37 changes the threshold currently used in the recognition method for the recognition target to a standard value (initial value). By this, the recognition target is recognized based on the threshold to be the standard, and the recognition target can stably tracked using the predicted position or the like of the recognition target.

Meanwhile, according to the description for the flowchart in FIG. 8, it has been described that the respective processing suitable for the shape change rate of the recognition object and the processing suitable for the shielded ratio of the recognition object are executed separately and independently. However, the respective processing may be executed in a combining manner, or integrated processing including these processing may be preliminarily executed.

Figure 9:
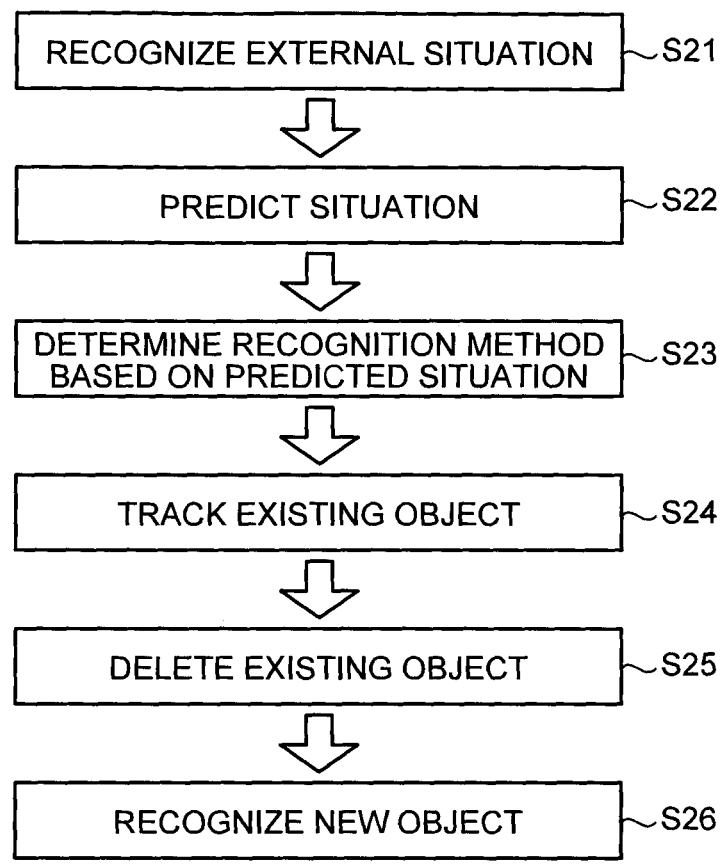
FIG. 9 is a flowchart for describing an entire flow of the recognition processing of the solid object recognition device according to the embodiment.

An entire flow of the above-described recognition processing according to the embodiment will be described again using a flowchart in FIG. 9. More specifically, as illustrated in Step S21 of FIG. 9, according to the solid object recognition device of the embodiment, the a scene situation recognizer 34 first recognizes an external situation indicating a situation of an imaging area corresponding to a range image acquired by the disparity image generator 31.

Subsequently, as illustrated in Step S22, the situation predictor 36 predicts a future external situation (next frame) from the recognition result of the scene situation recognizer 34. Next, as illustrated in Step S23, the tracking recognizer 37 selects and determines a recognition method suitable for a prediction result of the situation predictor 36 from among one or plural recognition methods to recognize the recognition target from the range image Then, as illustrated in Step S24, the tracking recognizer 37 tracks an existing object by using the determined recognition method. Further, the tracking recognizer 37 tracks the existing object by changing the threshold value used in the determined recognition method or using a different recognition method in accordance with the scene situation model and solid object model stored in the RAM 18 and representing the current situation, and the prediction result of the situation predictor 36.

Next, as illustrated in Step S25, the previous detection remover 38 removes the recognition target tracked by the tracking recognizer 37 from among the objects included in the current disparity image stored in the RAM 18, and stores the disparity image in the RAM 18 as the updated disparity image. Further, as illustrated in Step S26, the new object detector 39 recognizes a solid object such as a vehicle or a person inside the update disparity image from which the recognition target tracked by the tracking recognizer 37 is removed, thereby recognizing a new solid object different from the recognition target currently tracked by the tracking recognizer 37.

The solid object updater 40 updates the solid object model stored in the RAM 18 by reflecting the new solid object recognized by the new object detector 39 in the solid object model stored in the RAM 18 and illustrated in FIG. 6 as described above. The situation predictor 36 predicts the situation, using the updated solid object model in which the new solid object is thus reflected.

FIG. 10 is a diagram illustrating exemplary screens tracking the recognition target. The diagram indicated by a reference sign (a) in FIG. 10 illustrates a stereo image captured by the stereo camera unit 1. Further, the diagram indicated by a reference sign (b) in FIG. 10 illustrates a disparity image generated by the disparity image generator 31. Referring to a disparity image indicated by the reference sign (b) in FIG. 10 while referring to a normal captured image indicated by the reference sign (a) in FIG. 10, the scene situation recognizer 34 recognizes that a space between curbstones 50, 51 is a road where the own vehicle is traveling by recognizing the curbstones 50, 51. Further, wall portions 52, 53 formed along the curbstone 50, 51 are recognized. Furthermore, preceding vehicles 54 to 56 traveling in front of the own vehicle are recognized on the road. As is obvious from the diagram indicated by the reference sign (a) in FIG. 10, the preceding vehicle 54 is a community bus. Further, the preceding vehicle 55 traveling between the community bus and the own vehicle is a motorcycle. Additionally, in this example, the preceding vehicle 56 in front of the preceding vehicle 54 which is the community bus is a light automobile.

In such a situation, according to the related art, a distant vehicle like the light automobile of the preceding vehicle 56 is recognized and not recognized repeatedly, and stable recognition and tracking is hardly achieved. However, in the case of the solid object recognition device according to the embodiment, stable recognition (tracking) can be continuously executed using the above-described prediction result. Also, in the case of this example, the community bus (preceding vehicle 54) shielded by the preceding vehicle 55 which is the motorcycle can be also stably recognized while grasping motions of the motorcycle and the community bus by using the prediction result obtained by calculating the above-described shielded ratio of the recognition object and the like.

As is obvious from the above description, the solid object recognition device according to the embodiment first recognizes the situation, such as what kind of situation the controlled object like the own vehicle currently is in, whether there is any solid object previously detected, and what kind of situation the detected object currently is in. More specifically, the solid object recognition device recognizes the current situation and also predicts the future situation, and then recognizes the recognition target by selectively using the recognition method in accordance with the prediction result, or recognizes the recognition target by changing the threshold or the like used in the recognition method in accordance with the prediction result. By this, even the solid object which is repeatedly recognized/not recognized frame by frame due to a subtle change of brightness can be stably recognized. Further, recognition can be stably continued even in the case where the shape of the preceding vehicle is changed or the preceding vehicle is hardly seen by being hidden behind the wall or the like when the vehicle travels at a curved road.

The above-described embodiment is provided as the example and not intended to limit the scope of the present invention. The present novel embodiment can be implemented by other various kinds of modes, and further various kinds of omissions, replacements, and modifications may be made without departing from the gist of the invention. The embodiments and variations of respective embodiments may be included in the scope and the gist of the invention and also included in the inventions recited in the scope of claims and the scope equivalent thereto.

According to the embodiment, there is an effect that recognition accuracy for an object can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An image processing device, comprising:
processing circuitry configured to
acquire a current range image of a sequence of range images captured at different times, respectively, wherein each range image of the sequence of range images captures a scene as viewed from a moving vehicle,
recognize an external situation indicating a situation of an imaging area external to the moving vehicle and corresponding to the current range image,
recognize a recognition target in the current range image by a recognition method based on the recognized external situation,
when determining that the recognition target recognized in the current range image was also recognized in a previous range image captured at a time prior to a capture time of the current range image and is being tracked, remove the recognition target from the current range image to generate a new range image, and detect an object, different from the recognition target, in the new range image from which the recognition target has been removed.

2. The image processing device according to claim 1, wherein the processing circuitry is further configured to predict a next external situation of a next frame from the recognized external situation, and recognize a recognition object by the recognition method in accordance with the predicted next external situation.

3. The image processing device according to claim 2, wherein the processing circuitry is further configured to select the recognition method suitable for a prediction result from among one or a plurality of recognition methods to recognize the recognition object from the range image;

change a threshold of the recognition method used to recognize the recognition object to another threshold; and recognize the recognition object by using the selected recognition method and the another threshold.

4. The image processing device according to claim 2, wherein the processing circuitry is further configured to acquire an internal situation indicating an operational situation of a controlled device, wherein the processing circuitry is further configured to predict the next external situation of the next frame from the recognized external situation and the acquired internal situation.

5. The image processing device according to claim 1, wherein the processing circuitry is further configured to recognize the recognition target, from among a plurality of potential targets, based on a priority level.

6. The image processing device according to claim 2, wherein the processing circuitry is further configured to calculate and output, as the next external situation, a position of the recognition object, a shape change rate of the recognition object, and a shielded ratio of the recognition object.

7. A device control system, comprising:

processing circuitry configured to acquire a current range image of a sequence of range images captured at different times, respectively, wherein each range image of the sequence of range images captures a scene as viewed from a moving vehicle, recognize an external situation indicating a situation of an imaging area external to the moving vehicle and corresponding to the current range image, recognize a recognition target in the current range image by a recognition method based on the recognized external situation, when determining that the recognition target recognized in the current range image was also recognized in a previous range image captured at a time prior to a capture time of the current range image and is being tracked, remove the recognition target from the current range image to generate a new range image, and detect an object, different from the recognition target, in the new range image from which the recognition target has been removed.

8. A non-transitory computer-readable storage medium with an executable program stored thereon and executed by a computer, wherein the program instructs the computer to perform:

acquiring a current range image of a sequence of range images captured at different times, respectively, wherein each range image of the sequence of range images captures a scene as viewed from a moving vehicle;

recognizing an external situation indicating a situation of an imaging area external to the vehicle and corresponding to the current range image;

recognizing a recognition target in the current range image by a recognition method based on the recognized external situation;

when determining that the recognition target recognized in the current range image was also recognized in a previous range image captured at a time prior to a capture time of the current range image and is being tracked, removing the recognition target from the current range image to generate a new range image; and detecting an object, different from the recognition target, in the new range image from which the recognition target has been removed.

9. The image processing device of claim 1, wherein the range image is a disparity image, and the processing circuitry is further configured to store the new range image in a memory.

* * * * *